(12) United States Patent
Sumiji et al.

(10) Patent No.: US 8,587,895 B1
(45) Date of Patent: Nov. 19, 2013

(54) BEARING MECHANISM, MOTOR AND DISK DRIVE APPARATUS

(71) Applicant: Nidec Corporation, Kyoto (JP)

(72) Inventors: Akinobu Sumiji, Kyoto (JP); Akihiro Kimura, Kyoto (JP); Kunio Sakurada, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/785,297

(22) Filed: Mar. 5, 2013

(30) Foreign Application Priority Data

May 30, 2012 (JP) ................................ 2012-123006

(51) Int. Cl.
*G11B 17/02* (2006.01)
(52) U.S. Cl.
USPC ...................................... 360/99.08
(58) Field of Classification Search
USPC ........... 360/99.08, 99.16, 97.12, 97.19, 97.22
See application file for complete search history.

(56) References Cited

U.S. PATENT DOCUMENTS

| | | | |
|---|---|---|---|
| 5,533,811 | A | 7/1996 | Polch et al. |
| 5,558,443 | A | 9/1996 | Zang |
| 6,211,592 | B1 | 4/2001 | Ichiyama |
| 6,246,136 | B1 | 6/2001 | Ichiyama |
| 6,698,931 | B2 * | 3/2004 | Hino ............................ 384/107 |
| 8,284,515 | B2 * | 10/2012 | Sekii et al. .................. 360/99.08 |
| 2004/0090702 | A1 | 5/2004 | Aiello et al. |
| 2004/0096131 | A1 | 5/2004 | Aiello et al. |
| 2004/0156568 | A1 | 8/2004 | Woldemar et al. |
| 2004/0165797 | A1 | 8/2004 | Oku et al. |
| 2004/0175062 | A1 | 9/2004 | Nishimura et al. |
| 2005/0031237 | A1 | 2/2005 | Gomyo et al. |
| 2005/0111769 | A1 | 5/2005 | Haga |
| 2005/0225187 | A1 | 10/2005 | Hafen et al. |
| 2006/0002638 | A1 | 1/2006 | Ichiyama |
| 2006/0002641 | A1 | 1/2006 | Ichiyama |

(Continued)

FOREIGN PATENT DOCUMENTS

| | | |
|---|---|---|
| JP | 06-28335 U | 4/1994 |
| JP | 06-121484 A | 4/1994 |

(Continued)

OTHER PUBLICATIONS

Kimura et al., "Dynamic Pressure Bearing and Spindle Motor Using the Same", U.S. Appl. No. 12/952,223, filed Nov. 23, 2010.

(Continued)

*Primary Examiner* — Allen T Cao
(74) *Attorney, Agent, or Firm* — Keating & Bennett, LLP

(57) ABSTRACT

A bearing mechanism includes a shaft portion, a sleeve portion, a lower opposing portion, a lower outer ring-shaped portion, and an upper opposing portion. A lower seal portion serving as a pumping seal portion is provided in a lower seal gap between the sleeve portion and the lower outer ring-shaped portion. An upper seal portion is provided in an upper seal gap joined to an upper thrust gap. The lower portion of the sleeve portion includes a large-diameter portion and a small-diameter portion positioned below the large-diameter portion. The sleeve portion includes a communication path joined to the upper seal gap. The communication path includes an opening portion opened in a border between the large-diameter portion and the small-diameter portion. The outer peripheral portion of the lower opposing portion includes an outer periphery protrusion portion radially opposed to the small-diameter portion and axially opposed to the large-diameter portion.

16 Claims, 18 Drawing Sheets

(56) References Cited

U.S. PATENT DOCUMENTS

| | | |
|---|---|---|
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0029212 A1* | 2/2008 | Tamaoka ................ 156/275.5 |
| 2008/0056104 A1 | 3/2008 | Nishimura et al. |
| 2008/0218019 A1* | 9/2008 | Sumi ........................... 310/90 |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0231074 A1* | 9/2010 | Yamashita et al. ............. 310/90 |
| 2010/0321823 A1 | 12/2010 | Oe et al. |
| 2011/0123139 A1* | 5/2011 | Kimura et al. ................ 384/107 |
| 2011/0299193 A1* | 12/2011 | Sekii et al. .................. 360/99.08 |
| 2012/0033329 A1* | 2/2012 | Mizukami et al. ......... 360/99.08 |
| 2012/0237148 A1* | 9/2012 | Niwa et al. .................... 384/114 |
| 2012/0250183 A1* | 10/2012 | Tamaoka et al. .......... 360/99.08 |
| 2013/0101450 A1* | 4/2013 | Kimura et al. ............. 417/423.7 |
| 2013/0194701 A1* | 8/2013 | Fukushima ................ 360/99.08 |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.

Oe et al., "Bearing Apparatus, Spindle Motor, and Disk Drive Apparatus", U.S. Appl. No. 12/793,851, filed Jun. 4, 2010.

Yamada et al., "Fluid Dynamic Bearing Apparatus Arranged to Discharge Air Bubbles Generated Therein and a Spindle Motor and Disk Drive Apparatus Including the Same", U.S. Appl. No. 12/742,931, filed May 14, 2010.

Yamada et al., "Fluid Dynamic Bearing Apparatus, Spindle Motor, and Disk Drive Apparatus", U.S. Appl. No. 12/899,658, filed Oct. 7, 2010.

Yamada et al., "Fluid Dynamic Bearing Apparatus, Spindle Motor, and Disk Drive Apparatus", U.S. Appl. No. 13/299,542, filed Nov. 18, 2011.

Kimura et al., "Bearing Apparatus, Spindle Motor, and Disk Drive Apparatus", U.S. Appl. No. 13/602,420, filed Sep. 4, 2012.

Kimura et al., "Bearing Apparatus, Spindle Motor, and Disk Drive Apparatus", U.S. Appl. No. 13/681,500, filed Nov. 20, 2012.

Iwasaki et al., "Motor and Disk Drive Apparatus", U.S. Appl. No. 13/613,109, filed Sep. 13, 2012.

Tamaoka et al., "Motor and Disk Drive Apparatus", U.S. Appl. No. 13/613,106, filed Sep. 13, 2012.

Iwasaki et al., "Motor and Disk Drive Apparatus", U.S. Appl. No. 13/613,108, filed Sep. 13, 2012.

Fukushima et al., "Motor and Disk Drive Apparatus", U.S. Appl. No. 13/751,380, filed Jan. 28, 2013.

Sekii et al., "Spindle Motor and Disk Drive Apparatus", U.S. Appl. No. 13/767,205, filed Feb. 14, 2013.

Sekii et al., "Bearing Apparatus, Spindle Motor, and Disk Drive Apparatus", U.S. Appl. No. 13/789,796, filed Mar. 8, 2013.

Sekii et al.; "Bearing Apparatus, Spindle Motor, and Disk Drive Apparatus", U.S. Appl. No. 13/790,089, filed Mar. 8, 2013.

Sato et al., "Spindle Motor and Disk Drive Apparatus", U.S. Appl. No. 13/798,857, filed Mar. 13, 2013.

Sekii et al., "Motor and Disk Drive Appratus", U.S. Appl. No. 13/886,290, filed May 3, 2013.

Watanabe et al., "Spindle Motor and Disk Drive Apparatus", U.S. Appl. No. 13/898,921, filed May 21, 2013.

Kimura et al., "Bearing Mechanism, Motor, and Disk Drive Apparatus", U.S. Appl. No. 13/775,475, filed Feb. 25, 2013.

Sumiji et al., "Bearing Mechanism, Motor, and Disk Drive Apparatus", U.S. Appl. No. 13/775,467, filed Feb. 25, 2013.

Kimura et al., "Bearing Apparatus, Spindle Motor, and Disk Drive Apparatus", U.S. Appl. No. 13/602,348, filed Sep. 4, 2012.

English Translation of Official Communication issued in International Patent Application No. PCT/JP2009/059556, mailed on Jan. 20, 2011.

* cited by examiner

BEARING MECHANISM, MOTOR AND DISK DRIVE APPARATUS

BACKGROUND OF THE INVENTION

1. Field of the Invention

The present invention relates to a bearing mechanism, and more specifically to a bearing mechanism for use in a motor.

2. Description of the Related Art

Conventionally, a motor provided with a fluidic dynamic-pressure bearing mechanism has been used as a motor for a disk drive apparatus. For example, in a spindle motor disclosed in FIG. 1 of Japanese Patent Application Publication No. 2009-136143, a bottom plate 10, a first bearing component 16, a second bearing component 18n and a fixed shaft 12 define a fixed component unit. Fluidic dynamic-pressure radial bearing units 22a and 22b are arranged between the fixed shaft 12 and a rotor component 14. A fluidic dynamic-pressure thrust bearing unit 26 is arranged between the first bearing component 16 and the rotor component 14. A pumping seal 36 is arranged between the second bearing component 18 and the rotor component 14. The rotor component 14 is provided with a circulation path 28. The circulation path 28 interconnects a radial outer region of the thrust bearing unit 26 and a radial inner region of the pumping seal 36. A seal gap 34 is provided at the radial outer side of the thrust bearing unit 26.

In a case where a shaft is fixed, as in the spindle motor disclosed in Japanese Patent Application Publication No. 2009-136143, the upper side of a lower seal gap is covered with a rotor. This makes it impossible to fill a lubricant from the lower seal gap. However, if a lubricant is filled from an upper seal gap, the infiltration of the lubricant is stopped in an opening of a communication path. This may make it impossible to introduce the lubricant to the lower seal gap.

Accordingly, a demand has existed for a bearing mechanism that makes it possible to easily fill a lubricant into the bearing mechanism from an upper seal gap.

SUMMARY OF THE INVENTION

A bearing mechanism according to one illustrative preferred embodiment of the present invention includes a shaft portion, a sleeve portion, a lower opposing portion, a lower outer ring-shaped portion, and an upper opposing portion. The shaft portion is arranged about a center axis extending in an up-and-down direction. The shaft portion includes a cylindrical outer circumferential surface. The sleeve portion includes a through-hole arranged to accommodate the shaft portion. The sleeve portion is arranged to rotate about the center axis. The lower opposing portion extends radially outward from a lower portion of the shaft portion. The lower opposing portion includes an upper surface axially opposed to a lower end surface of the sleeve portion through a lower thrust gap. The lower outer ring-shaped portion includes a cylindrical or substantially cylindrical inner circumferential surface arranged to surround at least a portion of an outer circumferential surface of the sleeve portion. The relative position of the lower outer ring-shaped portion is fixed with respect to the lower opposing portion. The upper opposing portion extends radially outward from the shaft portion at an upper side of the sleeve portion. The upper opposing portion includes a lower surface axially opposed to an upper end surface of the sleeve portion through an upper thrust gap. A radial dynamic-pressure bearing portion is provided in a radial gap between the outer circumferential surface of the shaft portion and an inner circumferential surface of the sleeve portion. A lower thrust dynamic-pressure bearing portion is provided in the lower thrust gap. A lower seal portion is arranged in a lower seal gap between the outer circumferential surface of the sleeve portion and the inner circumferential surface of the lower outer ring-shaped portion. The lower seal portion is a pumping seal portion. An upper seal portion is arranged in an upper seal gap joined to the upper thrust gap. The sleeve portion includes a lower portion including a large-diameter portion and a small-diameter portion positioned below the large-diameter portion. The small-diameter portion is smaller in diameter than the large-diameter portion. The sleeve portion further includes a communication path joined to the upper seal gap. The communication path includes an opening portion opened in or near a border between the large-diameter portion and the small-diameter portion. The lower opposing portion includes an outer peripheral portion including an outer periphery protrusion portion radially opposed to an outer circumferential surface of the small-diameter portion and axially opposed to a lower surface of the large-diameter portion. A straight line interconnecting an outer edge of a lower surface of the small-diameter portion and an outer edge of the lower surface of the large-diameter portion on a cross section including the center axis extends across the outer periphery protrusion portion. A circulation path including the lower thrust gap, the radial gap, the upper thrust gap, and the communication pass communicates with the lower seal gap and the upper seal gap. A lubricant is filled in the circulation path, the lower seal gap and the upper seal gap.

According to various preferred embodiments of the present invention, it is possible to easily fill the lubricant into the bearing mechanism from the upper seal gap.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side of a motor in a center axis direction will be just referred to as "upper" and the lower side as "lower". The up-and-down direction is not intended to indicate the positional relationship or the orientation when the motor is installed within an actual device. The direction parallel or substantially parallel to the center axis will be referred to as "axial". The radial direction about the center axis will be just referred to as "radial". The circumferential direction about the center axis will be just referred to as "circumferential".

Figure 1:
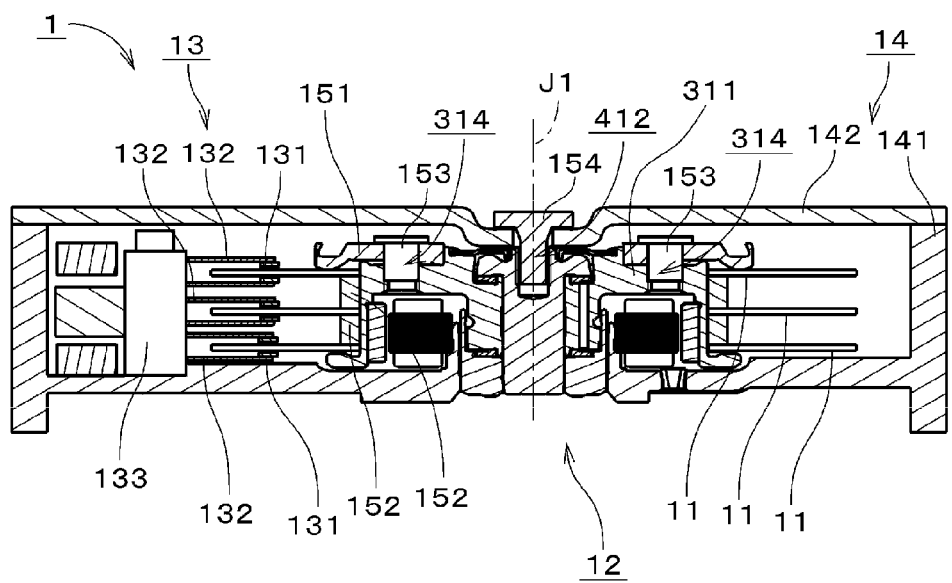
FIG. 1 is a sectional view of a disk drive apparatus according to a preferred embodiment of the present invention.

FIG. 1 is a vertical sectional view of a disk drive apparatus 1 including a spindle motor (hereinafter just referred to as "motor") according to one illustrative preferred embodiment of the present invention. The disk drive apparatus 1 is preferably a so-called hard disk drive apparatus. The disk drive apparatus 1 preferably includes, e.g., three disks 11, a motor 12, an access unit 13, and a housing 14. The motor 12 is configured to rotate the disks 11. The access unit 13 performs at least one of information reading and writing tasks with respect to the disks 11.

The housing 14 preferably includes an open-top box-shaped first housing member 141 and a flat second housing member 142. The second housing member 142 is fitted to the first housing member 141 so as to define the housing 14. The disks 11, the motor 12 and the access unit 13 are accommodated within the housing 14. Preferably, the internal space of the disk drive apparatus 1 is a clean space in which dust is not present or is extremely rare. In the present preferred embodiment, air is filled into the disk drive apparatus 1. Alternatively, helium gas, hydrogen gas, etc. may be filled into the disk drive apparatus 1. Moreover, a mixture of air and helium gas or air and hydrogen gas may be filled into the disk drive apparatus 1.

The three disks 11 are fixed to a rotor hub of the motor 12 at a regular or substantially regular interval along the direction of a center axis J1 by virtue of a clamper 151 and spacers 152. The access unit 13 preferably includes six heads 131, six arms 132, and a head moving mechanism 133. The heads 131 come close to the disks 11 and magnetically perform at least one of information reading and writing tasks. The arms 132 are configured to support the heads 131. The head moving mechanism 133 is configured to move the arms 132 so as to move the heads 131 relative to the disks 11. With this configuration, the heads 131 come close to the rotating disks 11 and gain access to desired positions of the disks 11. The number of the disks 11 is not limited to three but may be one, two, or more than three, for example.

Figure 2:
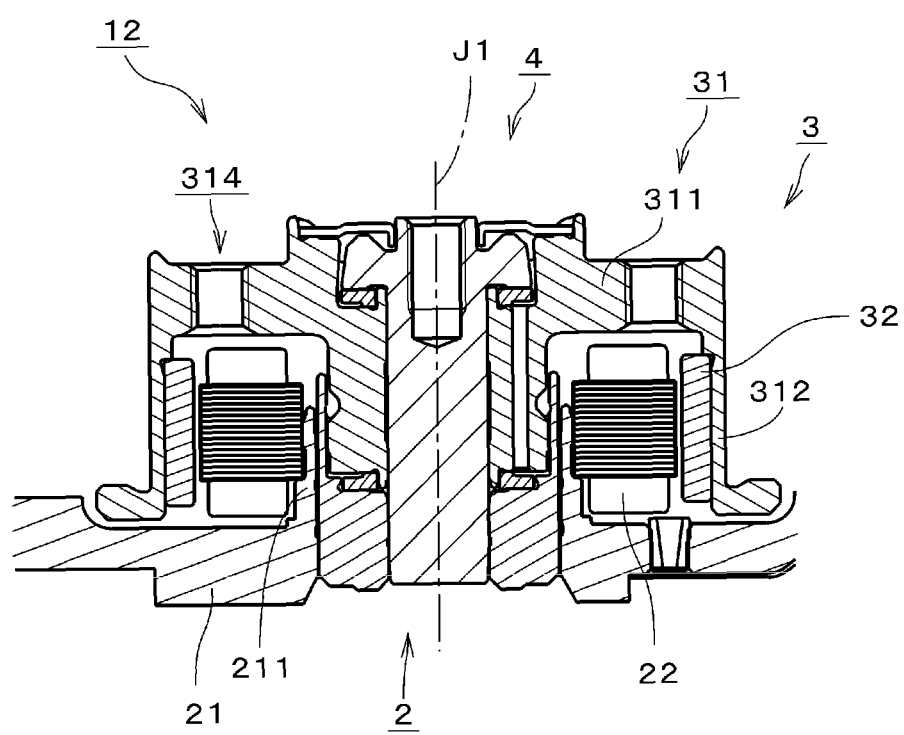
FIG. 2 is a sectional view of a motor according to a preferred embodiment of the present invention.

FIG. 2 is a vertical sectional view of the motor 12 in accordance with a preferred embodiment of the present invention. The motor 12 is preferably an outer rotor type motor. The motor 12 preferably includes a stationary unit 2 as a fixed assembly, a rotary unit 3 as a rotating assembly, and a bearing mechanism 4. The rotary unit 3 is rotatably supported by the bearing mechanism 4 to rotate about the center axis J1 with respect to the stationary unit 2.

The stationary unit 2 preferably includes a base plate 21 as a base portion and a stator 22. The base plate 21 and the first housing member 141 shown in FIG. 1 are preferably provided by a single monolithic member. The base plate 21 is a portion of the housing 14. The stator 22 is fixed around a cylindrical holder 211 of the base plate 21. The bearing mechanism 4 is fixed to a hole portion provided inside the holder 211. Alternatively, the base plate 21 and the first housing member 141 may be defined by different members.

The rotary unit 3 preferably includes a rotor hub 31 and a rotor magnet 32. The rotor hub 31 preferably includes a cover portion 311 and a cylinder portion 312. The cover portion 311 extends radially outward from the upper portion of the bearing mechanism 4. The cylinder portion 312 extends downward from an outer edge portion of the cover portion 311. The rotor magnet 32 is fixed to an inner surface of the cylinder portion 312. The rotor magnet 32 is radially opposed to the stator 22. Torque is generated between the stator 22 and the rotor magnet 32.

In the axial direction, the magnetic center of the stator 22 is positioned below the magnetic center of the rotor magnet 32. In the motor 12, a magnetic action which attracts the rotor magnet 32 downward is generated between the rotor magnet 32 and the stator 22.

The cover portion 311 preferably includes holes 314 used in fixing a clamper 151 arranged to clamp the disks 11 shown in FIG. 1. The holes 314 are positioned above the stator 22 and are arranged to extend through the cover portion 311 in the up-and-down direction. When the clamper 151 is attached to the motor 12, fasteners 153, such as, for example, screws are inserted into the through-holes of the clamper 151 and the holes 314 of the cover portion 311. Thus, the clamper 151 is fixed to the upper surface of the cover portion 311.

Figure 3:
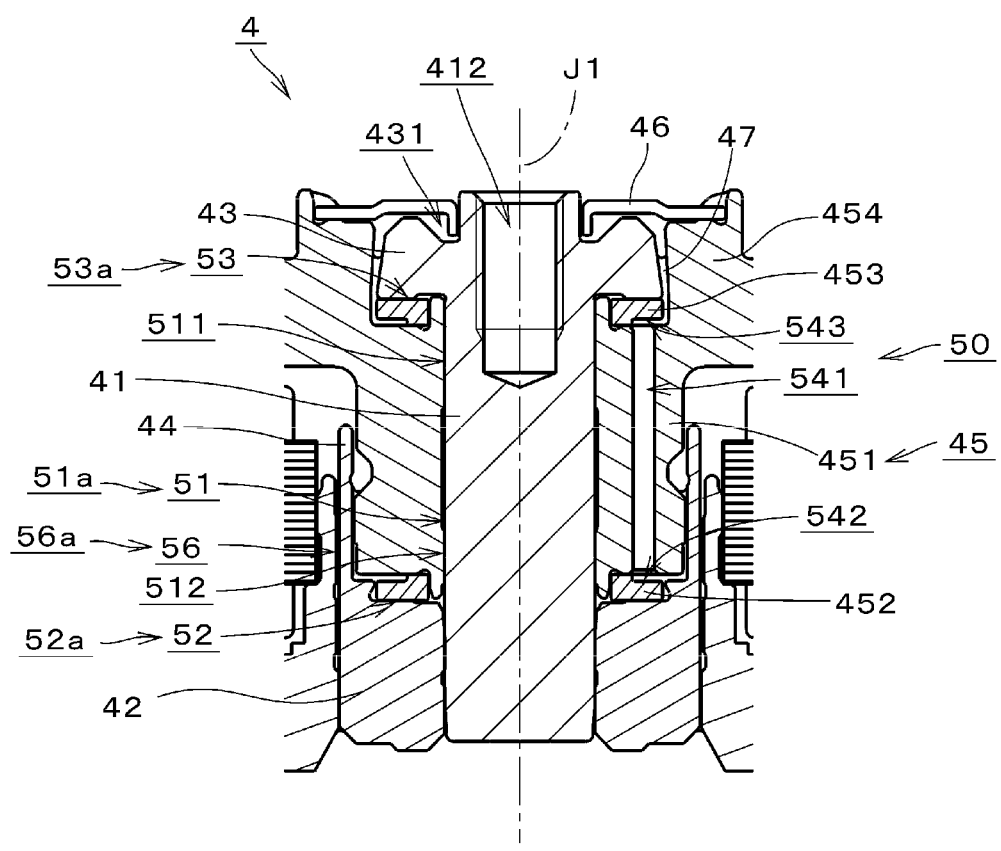
FIG. 3 is a sectional view of a bearing mechanism according to a preferred embodiment of the present invention.

FIG. 3 is an enlarged sectional view of the bearing mechanism 4. The bearing mechanism 4 preferably includes a shaft portion 41, a lower opposing portion 42, an upper opposing portion 43, a lower outer ring-shaped portion 44, a sleeve portion 45, a cap 46, and a lubricant 47. The shaft portion 41, the lower opposing portion 42, the upper opposing portion 43, and the lower outer ring-shaped portion 44 may be regarded as portions of the stationary unit 2. The sleeve portion 45 and the cap 46 may be regarded as portions of the rotary unit 3.

The shaft portion 41 preferably includes a cylindrical outer circumferential surface. The shaft portion 41 is preferably, for example, press-fitted to the hole portion defined inside the lower opposing portion 42 and is arranged to extend along the center axis J1 in the up-and-down direction. The shaft portion 41 is preferably made of, e.g., stainless steel. A hole 412 is preferably provided in the upper portion of the shaft portion 41. The second housing member 142 is fixed to the motor 12 by inserting a fastener 154, such as, for example, a screw, into the central through-hole of the second housing member 142 and the hole 412 of the shaft portion 41 as shown in FIG. 1.

The lower opposing portion 42 is preferably made of, e.g., copper or high-tension brass. The lower opposing portion 42 extends radially outward from the lower portion of the shaft portion 41. The upper surface of the lower opposing portion 42 is axially opposed to the lower end surface of the sleeve portion 45. Accordingly, the lower outer ring-shaped portion 44 is fixed relative to the lower opposing portion 42. The lower outer ring-shaped portion 44 extends upward from the outer edge portion of the lower opposing portion 42. The lower outer ring-shaped portion 44 is positioned outside the outer circumferential surface of the sleeve portion 45. The inner circumferential surface of the lower outer ring-shaped portion 44 has a cylindrical or substantially cylindrical shape and surrounds at least a portion of the outer circumferential surface of the sleeve portion 45. The upper opposing portion 43 extends radially outward from the upper portion of the shaft portion 41 at the upper side of the sleeve portion 45. The lower surface of the upper opposing portion 43 is axially opposed to the upper end surface of the sleeve portion 45. The cap 46 is fixed to the upper end of the sleeve portion 45. The cap 46 is positioned above the upper opposing portion 43.

The shaft portion 41 is arranged inside the sleeve portion 45. The sleeve portion 45 is supported by the shaft portion 41 to rotate about the center axis J1. The sleeve portion 45 preferably includes a sleeve body 451, a lower thrust plate 452, an upper thrust plate 453, and a flange portion 454. The sleeve body 451 is preferably made of, e.g., stainless steel, aluminum, copper, etc. The sleeve body 451 preferably includes a through-hole arranged to accommodate the shaft portion 41. The sleeve body 451 preferably includes a vertical communication path 541 extending in the up-and-down direction, which serves as a first communication path. The sleeve body 451 is positioned between the outer circumferential surface of the shaft portion 41 and the inner circumferential surface of the lower outer ring-shaped portion 44.

The flange portion 454 protrudes radially outward from the upper portion of the sleeve body 451. The flange portion 454 is preferably connected to the cover portion 311 shown in FIG. 2. Alternatively, the flange portion 454 may be provided independently of the sleeve body 451. Also, the cover portion 311 may be provided independently of the flange portion 454.

The cap 46 has a flat or substantially flat annular shape. The outer peripheral portion of the cap 46 is fixed to the upper portion of the flange portion 454. The inner peripheral portion of the cap 46 is positioned above the upper opposing portion 43. The inner peripheral end portion of the cap 46 is bent downward. The upper portion of the upper opposing portion 43 preferably includes an annular recess portion 431 depressed downward. The lower end of the inner peripheral end portion of the cap 46 is positioned within the recess portion 431.

The lower thrust plate 452 has an annular shape. The lower thrust plate 452 is fixed to the lower portion of the sleeve body 451. The lower surface of the lower thrust plate 452 serves as the lower surface of the sleeve portion 45. A lower horizontal communication path 542 serving as a second communication path is defined between the sleeve body 451 and the lower thrust plate 452. The lower horizontal communication path 542 extends from the lower end of the vertical communication path 541 to the outer circumferential surface of the sleeve portion 45. The lower horizontal communication path 542 can be easily defined by the lower thrust plate 452.

The upper thrust plate 453 has an annular shape. The upper thrust plate 453 is fixed to the upper portion of the sleeve body 451. The upper surface of the upper thrust plate 453 serves as the upper surface of the sleeve portion 45. An upper horizontal communication path 543 serving as a third communication path is defined between the sleeve body 451 and the upper thrust plate 453. The upper horizontal communication path 543 extends from the upper end of the vertical communication path 541 to the outer circumferential surface of the sleeve portion 45. The upper horizontal communication path 543 can be easily defined by the upper thrust plate 453. As stated above, the sleeve portion 45 preferably includes communication paths which include the vertical communication path 541, the lower horizontal communication path 542 and the upper horizontal communication path 543.

Figure 4:
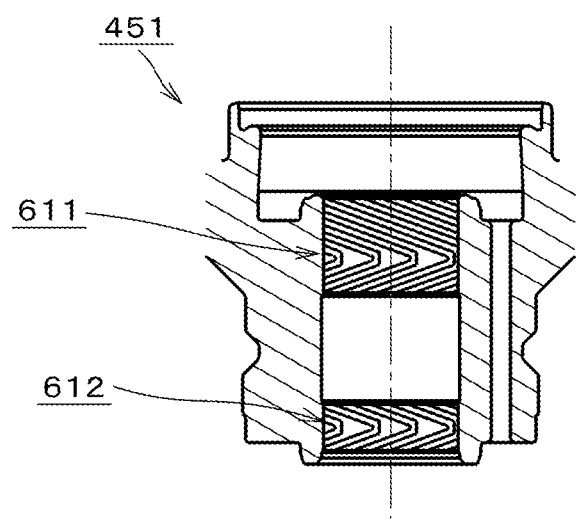
FIG. 4 is a sectional view of a sleeve body according to a preferred embodiment of the present invention.

FIG. 4 is a sectional view of the sleeve body 451, which additionally shows those portions lying more inward. Dynamic pressure grooves are preferably arranged on the inner circumferential surface of the sleeve body 451, namely on the inner circumferential surface of the sleeve portion 45. Consequently, as shown in FIG. 3, a radial dynamic-pressure bearing portion 51a is provided in a radial gap 51 between the outer circumferential surface of the shaft portion 41 and the inner circumferential surface of the sleeve portion 45. The radial dynamic-pressure bearing portion 51a preferably includes an upper radial dynamic-pressure bearing portion 511 and a lower radial dynamic-pressure bearing portion 512. The upper radial dynamic-pressure bearing portion 511 preferably includes a herringbone-shaped upper radial dynamic-pressure groove array 611. The lower radial dynamic-pressure bearing portion 512 preferably includes a herringbone-shaped lower radial dynamic-pressure groove array 612. In the upper radial dynamic-pressure groove array 611, the axial length of an upper herringbone region is preferably larger than the axial length of a lower herringbone region. In the lower radial dynamic-pressure groove array 612, the axial length of an upper herringbone region is preferably equal or substantially equal to the axial length of a lower herringbone region.

Figure 5:
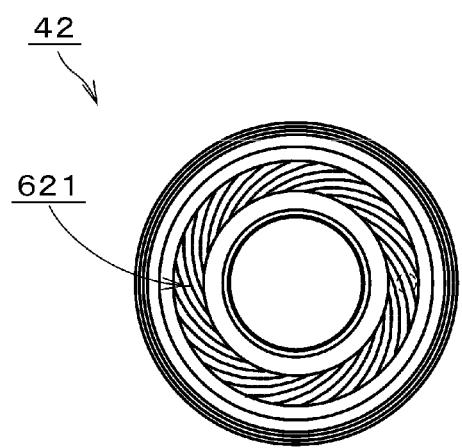
FIG. 5 is a plan view of a lower opposing portion according to a preferred embodiment of the present invention.
Figure 6:
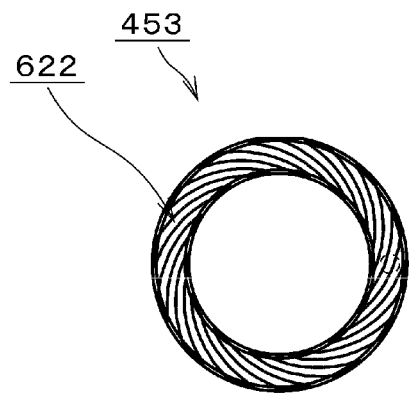
FIG. 6 is a plan view of an upper thrust plate according to a preferred embodiment of the present invention.

FIG. 5 is a plan view of the lower opposing portion 42 according to a preferred embodiment of the present invention. A spiral lower thrust dynamic-pressure groove array 621 serving as a dynamic pressure generating groove array is arranged on the upper surface of the lower opposing portion 42. As shown in FIG. 3, a lower thrust dynamic-pressure bearing portion 52a is defined in a lower thrust gap 52 between the lower surface of the sleeve portion 45 and the upper surface of the lower opposing portion 42. In other words, the upper surface of the lower opposing portion 42 is axially opposed to the lower end surface of the sleeve portion 45 through the lower thrust gap 52. FIG. 6 is a plan view of the upper thrust plate 453. A spiral upper thrust dynamic-pressure groove array 622 serving as a dynamic pressure generating groove array is preferably arranged on the upper surface of the upper thrust plate 453. As shown in FIG. 3, an upper thrust dynamic-pressure bearing portion 53a is defined in an upper thrust gap 53 between the upper end surface of the sleeve portion 45 and the lower surface of the upper opposing portion 43. In other words, the lower surface of the upper opposing portion 43 is axially opposed to the upper end surface of the sleeve portion 45 through the upper thrust gap 53. A lower seal portion 56a is preferably defined in a lower seal gap 56 between the outer circumferential surface of the sleeve portion 45 and the inner circumferential surface of the lower outer ring-shaped portion 44.

While the upper surface of the upper thrust plate 453 preferably includes a thrust dynamic-pressure groove array, the lower surface of the lower thrust plate 452 preferably does not include a thrust dynamic-pressure groove array. Thus, it is possible to prevent a worker from confusing the upper thrust plate 453 with the lower thrust plate 452 when assembling the bearing mechanism 4.

Figure 7:
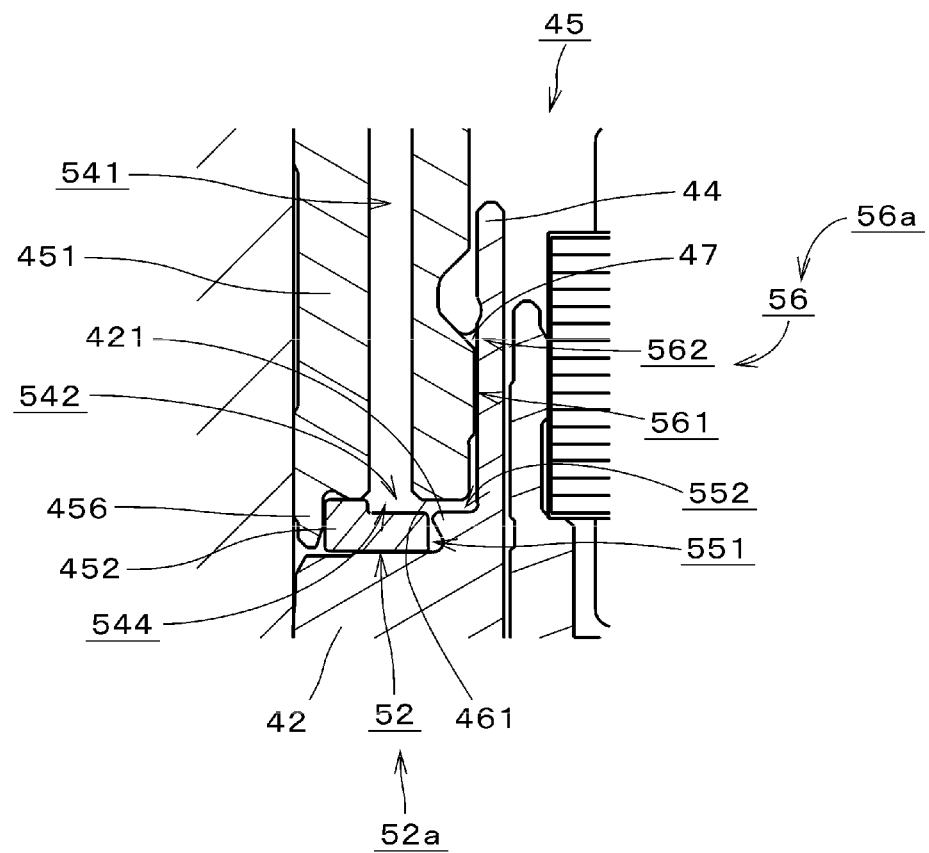
FIG. 7 is an enlarged sectional view showing a lower horizontal communication path according to a preferred embodiment of the present invention and its vicinity.
Figure 8:
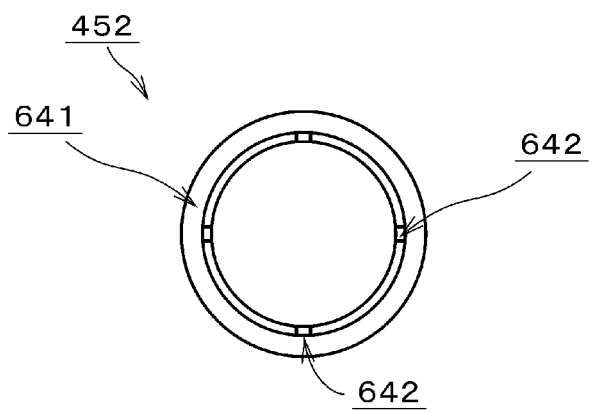
FIG. 8 is a plan view of a lower thrust plate according to a preferred embodiment of the present invention.

FIG. 7 is an enlarged sectional view showing the lower horizontal communication path 542 and its vicinity. FIG. 8 is a plan view of the lower thrust plate 452. The upper surface of the lower thrust plate 452 preferably includes a height variation portion 641. The height variation portion 641 is preferably provided in the entire periphery of the upper surface of the lower thrust plate 452. The radial outer region of the height variation portion 641 is positioned axially below the radial inner region of the height variation portion 641. The radial outer region of the height variation portion 641 defines the lower horizontal communication path 542 in cooperation with the lower portion of the sleeve body 451. Since the height variation portion 641 is provided in the entire periphery of the upper surface of the lower thrust plate 452, it becomes possible to attach the lower thrust plate 452 to the sleeve body 451 without having to give consideration to the orientation of the lower thrust plate 452. The upper surface of the lower thrust plate 452 preferably includes a plurality of radially-extending adhesive agent grooves 642 arranged radially inward of the height variation portion 641.

The sleeve body 451 preferably includes a lower annular surface 461 radially extending about the center axis J1 and opposed to the upper surface of the lower thrust plate 452. The lower annular surface 461 is a portion of the lower surface of the sleeve body 451. The vertical communication path 541 preferably includes a lower opening portion 544 opened on the lower annular surface 461. At least a portion of the radial outer region of the height variation portion 641 of the lower thrust plate 452 shown in FIG. 8 is axially opposed to the lower opening portion 544.

The lower inner peripheral portion of the sleeve body 451 preferably includes a lower protrusion portion 456 protruding downward. The lower protrusion portion 456 is inserted into the lower thrust plate 452. By providing the lower protrusion portion 456, it is possible to easily attach the lower thrust plate 452 in a desired position.

The outer diameter of the lower thrust plate 452 is smaller than the outer diameter of the lower portion of the sleeve body 451. In other words, the sleeve body 451 preferably includes a large-diameter portion arranged in the lower portion thereof. The lower thrust plate 452 serves as a small-diameter portion. The lower portion of the sleeve portion 45 preferably includes a large-diameter portion and a small-diameter portion positioned below the large-diameter portion and having a diameter smaller than the diameter of the large-diameter portion. The outer peripheral portion of the lower opposing portion 42 preferably includes an outer periphery protrusion portion 421 protruding upward. The outer periphery protrusion portion 421 is positioned inside the lower outer ring-shaped portion 44. The outer periphery protrusion portion 421 is positioned radially outward of the lower thrust plate 452. In other words, the outer periphery protrusion portion 421 is radially opposed to the outer circumferential surface of the small-diameter portion of the sleeve portion 45. An axially-extending vertical gap 551 is defined between the outer circumferential surface of the lower thrust plate 452 and the inner circumferential surface of the outer periphery protrusion portion 421. The upper end of the vertical gap 551 is connected to the outer peripheral portion of the lower horizontal communication path 542. The lower end of the vertical gap 551 is connected to the outer peripheral portion of the lower thrust gap 52.

The outer periphery protrusion portion 421 is axially opposed to the lower portion of the sleeve body 451. In other words, the upper surface of the outer periphery protrusion portion 421 is axially opposed to the lower surface of the large-diameter portion of the sleeve portion 45. A horizontal gap 552 is defined between the upper surface of the outer periphery protrusion portion 421 and the lower annular surface 461 of the sleeve body 451. The horizontal gap 552 extends in the radial direction. The inner peripheral portion of the horizontal gap 552 is connected to the outer peripheral portion of the lower horizontal communication path 542. The outer peripheral portion of the horizontal gap 552 is connected to the lower end of the lower seal gap 56.

The lower horizontal communication path 542 defined by the lower thrust plate 452 essentially interconnects the lower opening portion 544 of the vertical communication path 541 and the lower seal gap 56. In other words, the horizontal gap 552 can be regarded as a portion of the lower seal portion 56a. The lower opening portion 544 of the vertical communication path 541 axially overlaps with the lower thrust dynamic-pressure bearing portion 52a. This makes it possible to easily increase the size of the lower thrust dynamic-pressure bearing portion 52a. As a result, it is possible to easily obtain a large enough levitation force required for the lower thrust dynamic-pressure bearing portion 52a to lift the rotary unit 3.

The lower seal portion 56a serves as a pumping seal portion and preferably includes a pumping section 561 and a buffer section 562. The lower end of the pumping section 561 is connected to the outer peripheral portion of the horizontal gap 552. The buffer section 562 is positioned above the pumping section 561 and is connected to the upper end of the pumping section 561. In the pumping section 561, the lower seal gap 56 has a cylindrical or substantially cylindrical shape. In the pumping section 561, spiral grooves are arranged on the inner circumferential surface of the lower outer ring-shaped portion 44. In the pumping section 561, a force which pushes the lubricant 47 downward is generated by the rotation of the sleeve portion 45.

In the buffer section 562, the outer circumferential surface of the sleeve portion 45 is inclined radially inward and upward. In the buffer section 562, the radial width of the lower seal gap 56 is gradually increased upward. When the sleeve portion 45 is kept stationary, a boundary surface of the lubricant 47 is preferably arranged in the buffer section 562. When the sleeve portion 45 rotates, the lubricant 47 flows from the buffer section 562 toward the pumping section 561. Thus, the boundary surface of the lubricant 47 moves downward. Alternatively, the boundary surface may be positioned within the pumping section 561.

Figure 9:
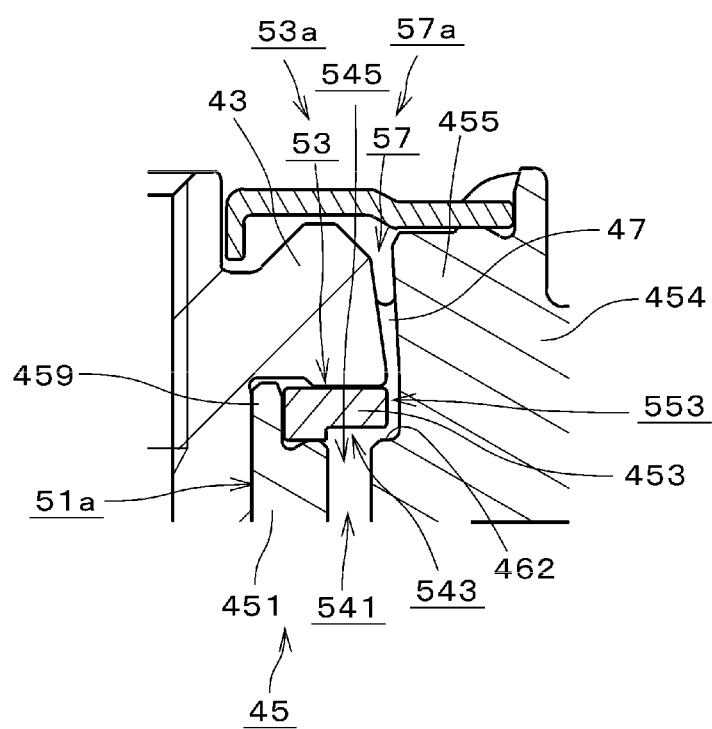
FIG. 9 is an enlarged sectional view showing an upper horizontal communication path according to a preferred embodiment of the present invention and its vicinity.

FIG. 9 is an enlarged sectional view showing the upper horizontal communication path 543 and its vicinity. The lower surface of the upper thrust plate 453 preferably has substantially the same shape as the plan-view shape of the lower thrust plate 452 shown in FIG. 8. In other words, the lower surface of the upper thrust plate 453 preferably includes a height variation portion. The height variation portion is preferably provided on the entire periphery of the lower surface of the upper thrust plate 453. The radial outer region of the height variation portion is positioned axially above the radial inner region of the height variation portion. The radial outer region of the height variation portion defines the upper horizontal communication path 543 in cooperation with the upper portion of the sleeve body 451. Since the height variation portion is provided in the entire periphery of the lower surface of the upper thrust plate 453, it becomes possible to attach the upper thrust plate 453 to the sleeve body 451 without having to give consideration to the orientation of the upper thrust plate 453. As shown in FIG. 8, a plurality of radially-extending adhesive agent grooves is arranged radially inward of the height variation portion.

The sleeve body 451 preferably includes an upper annular surface 462 radially extending about the center axis J1 and opposed to the lower surface of the upper thrust plate 453. The upper annular surface 462 is a portion of the upper surface of the sleeve body 451. The vertical communication path 541 preferably includes an upper opening portion 545 opened on the upper annular surface 462. At least a portion of the radial outer region of the height variation portion of the upper thrust plate 453 is axially opposed to the upper opening portion 545.

The upper inner peripheral portion of the sleeve body 451 preferably includes an upper protrusion portion 459 protruding upward. The upper protrusion portion 459 is inserted into the upper thrust plate 453. By providing the upper protrusion portion 459, it is preferably possible to easily attach the upper thrust plate 453 in a desired position. The upper end of the upper protrusion portion 459 is positioned axially above the upper surface of the upper thrust plate 453. A portion of the radial dynamic-pressure bearing portion 51a radially overlaps with the upper thrust plate 453. In other words, the radial dynamic-pressure bearing portion 51a can be positioned upward by providing the upper protrusion portion 459. As a result, the center of the rotary unit 3 and the center of the radial dynamic-pressure bearing portion 51a can be caused to come close to each other. This makes it possible to significantly reduce and prevent vibration.

Since the upper horizontal communication path 543 is defined by the upper thrust plate 453, the upper opening portion 545 axially overlaps with the upper thrust dynamic-pressure bearing portion 53a. This makes it possible to increase the size of the upper thrust dynamic-pressure bearing portion 53a.

The inner peripheral portion of the flange portion 454 protrudes upward from the outer peripheral portion of the sleeve body 451 and surrounds the radial outer surface of the upper opposing portion 43. In other words, the cylindrical or substantially cylindrical inner circumferential surface of the flange portion 454 surrounds at least a portion of the outer circumferential surface of the upper opposing portion 43 at the radial outer side. The inner circumferential surface of the flange portion 454 is radially opposed to the outer circumferential surface of the upper thrust plate 453. In the following description, the inner peripheral portion of the flange portion 454 will be referred to as "upper outer ring-shaped portion 455". The upper outer ring-shaped portion 455 is a portion whose relative position is fixed with respect to the sleeve portion 45.

An upper seal gap 57 is defined between the inner circumferential surface of the upper outer ring-shaped portion 455 and the outer circumferential surface of the upper opposing portion 43. The upper horizontal communication path 543 interconnects the upper opening portion 545 and the upper seal gap 57. The upper seal gap 57 defines an upper seal portion 57a. An axially-extending vertical gap 553 is defined between the outer circumferential surface of the upper thrust plate 453 and the inner circumferential surface of the upper outer ring-shaped portion 455. The upper end of the vertical gap 553 is joined to the lower end of the upper seal gap 57 and the outer peripheral portion of the upper thrust gap 53. In other words, the upper seal gap 57 is joined to the upper thrust gap 53. The lower end of the vertical gap 553 is connected to the outer peripheral portion of the upper horizontal communication path 543.

The radial width of the upper seal gap 57 is increased upward. In the upper seal portion 57a, the outer circumferential surface of the upper opposing portion 43 is preferably inclined radially inward and upward. Likewise, the inner circumferential surface of the upper outer ring-shaped portion 455 is inclined radially inward and upward. In this manner, the upper seal portion 57a is inclined radially inward and upward. Accordingly, any air bubbles existing within the lubricant 47 can be efficiently discharged through the use of centrifugal forces acting on the lubricant 47.

As shown in FIG. 3, there is provided a circulation path 50 mainly defined by the lower thrust gap 52, the radial gap 51, the upper thrust gap 53, the vertical gap 553, the upper horizontal communication path 543, the vertical communication path 541, the lower horizontal communication path 542 and the vertical gap 551. The circulation path 50 is filled with the lubricant 47. The circulation path 50 and the lower seal gap 56 communicate with each other. The circulation path 50 and the upper seal gap 57 communicate with each other. The lubricant 47 is filled over a range extending from the circulation path 50 to the lower seal gap 56 and is also filled over a range extending from the circulation path 50 to the upper seal gap 57. In other words, the horizontal gap 552 extending from the radial outer opening of the lower horizontal communication path 542 to the lower seal gap 56 is preferably filled with the lubricant 47. The vertical gap 553 extending from the radial outer opening of the upper horizontal communication path 543 to the upper seal gap 57 is also filled with the lubricant 47.

Since the motor 12 is provided with the lower thrust plate 452 and the upper thrust plate 453, it is possible to increase the load capacity and to reduce the levitation start revolution number. Inasmuch as the sliding contact time in the thrust bearing becomes shorter during the startup and stop operations, it is possible to prolong the lifespan of the motor 12. By enhancing the thrust bearing performance, it is possible to increase the shaft diameter and to reduce the bearing attenuation. This makes it possible to significantly reduce and prevent the vibration response at a high frequency. The lower thrust plate 452 and the upper thrust plate 453 are preferably manufactured by, for example, pressing, cutting, etc. The lower thrust plate 452 and the upper thrust plate 453 may be made of a solid material or a sintered material.

As mentioned earlier, in the upper radial dynamic-pressure groove array 611, the axial length of the upper herringbone region is preferably larger than the axial length of the lower herringbone region. In the lower radial dynamic-pressure groove array 612, the axial length of the upper herringbone region is preferably equal or substantially equal to the axial length of the lower herringbone region. Consequently, a dynamic pressure acting to push the lubricant 47 axially downward is generated in the radial dynamic-pressure bearing portion 51a. In the circulation path 50, due to the dynamic pressure thus generated, the lubricant 47 flows downward along the radial gap 51 during the rotation of the sleeve portion 45. Accordingly, it is possible to easily prevent generation of a negative pressure in the lower seal portion 56a as a pumping seal portion.

Figure 10:
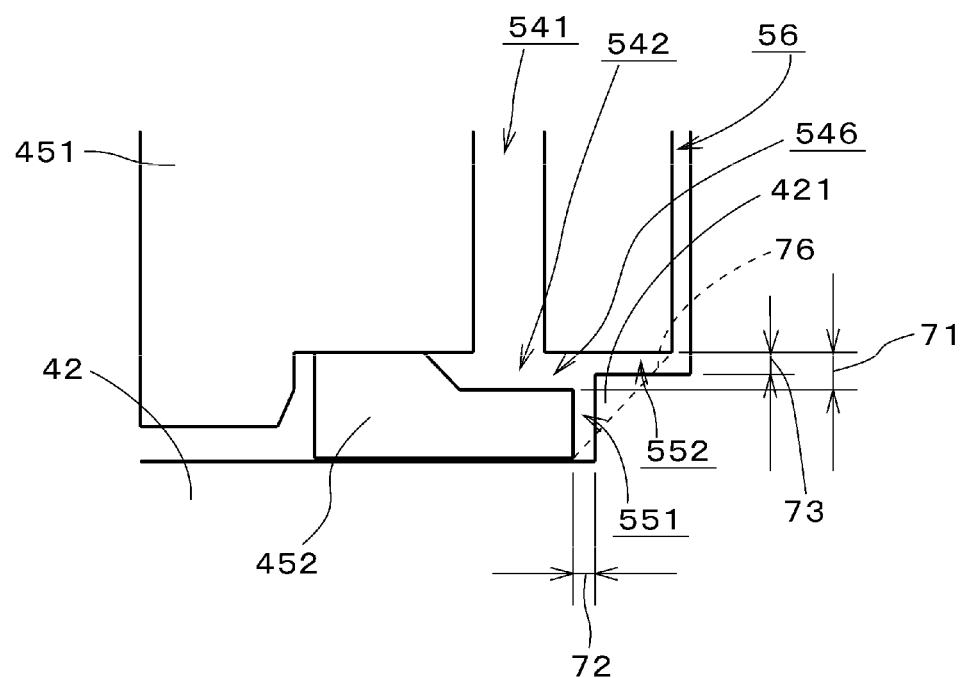
FIG. 10 is a schematic diagram showing a lower thrust plate according to a preferred embodiment of the present invention and its vicinity.

FIG. 10 is a schematic diagram showing the lower thrust plate 452 and its vicinity. In FIG. 10 and the similar figures to be described below, the cross section is not hatched. When manufacturing the bearing mechanism 4, the lubricant 47 is preferably injected from the upper seal gap 57. In the bearing mechanism 4, the sleeve body 451 and the flange portion 454 are preferably formed as a single monolithic member. For that reason, it is almost impossible to inject the lubricant 47 from the lower seal gap 56. When injecting the lubricant 47, as shown in FIG. 10, the lower surface of the lower thrust plate 452 makes contact with the upper surface of the lower opposing portion 42 in the axial direction.

There is a likelihood that, during the injection process, the lubricant 47 flowing through the vertical communication path 541 and the lower horizontal communication path 542 may be stopped in a horizontal opening portion 546 as an outlet of the lower horizontal communication path 542 due to the surface tension of the lubricant 47. The horizontal opening portion 546 is preferably opened in a border between the lower portion of the sleeve body 451 and the lower thrust plate 452, namely a border between the large-diameter portion and the small-diameter portion. In the present preferred embodiment, the horizontal opening portion 546 is positioned on the outer circumferential surface of the lower thrust plate 452. In the bearing mechanism 4 of the present preferred embodiment, the outer periphery protrusion portion 421 is arranged to protrude toward the horizontal opening portion 546 such that the lubricant 47 reaching the horizontal opening portion 546 comes into contact with the outer periphery protrusion portion 421. This makes it possible to easily guide the lubricant 47 to the vertical gap 551, the horizontal gap 552, and the lower seal gap 56.

When the sleeve portion 45 is kept stationary, namely when the lower surface of the sleeve portion 45 makes contact with the upper surface of the lower opposing portion 42 in the axial direction, the minimum radial width 72 between the outer circumferential surface of the lower thrust plate 452 and the inner circumferential surface of the outer periphery protrusion portion 421 and the minimum axial width 73 between the lower surface of the lower portion of the sleeve body 451 and the upper surface of the outer periphery protrusion portion 421 is preferably equal to or smaller than the axial width 71 of the radial outer opening of the lower horizontal communication path 542. Moreover, the upper surface of the region of the lower thrust plate 452 arranged radially outward of the height variation portion 641 is preferably positioned below the upper surface of the outer periphery protrusion portion 421. More preferably, on the cross section including the center axis J1, the straight line 76 interconnecting the outer edge of the lower surface of the lower thrust plate 452 and the outer edge of the lower surface of the lower portion of the sleeve body 451 extends across the outer periphery protrusion portion 421. This preferably makes it possible to fill the lubricant 47 with ease. The "outer edge of the lower surface" preferably does not include any chamfered portion.

The structure mentioned just above is especially suitable in a case where the upper portion of the outer peripheral portion of the sleeve portion 45 extends radially outward of the lower seal portion 56a and in a case where the lubricant 47 cannot be virtually injected from the lower seal portion 56a.

Figure 11:
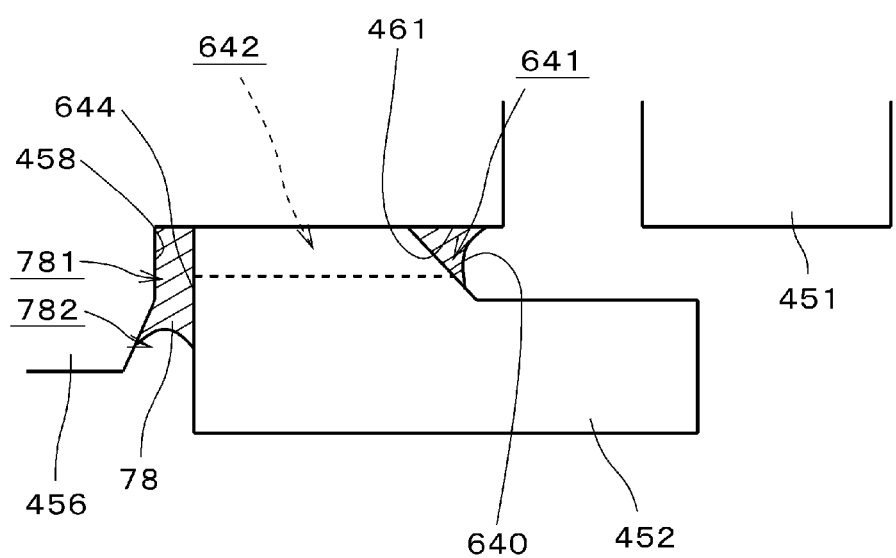
FIG. 11 is a schematic diagram showing a lower thrust plate according to a preferred embodiment of the present invention and its vicinity.

FIG. 11 is a schematic diagram showing the lower thrust plate 452 in accordance with a preferred embodiment of the present invention and its vicinity. The lower thrust plate 452 is preferably bonded to the sleeve body 451 by an adhesive agent 78. Use of the adhesive agent 78 makes it possible to fit the lower thrust plate 452 to the lower protrusion portion 456 in a running fit state. This makes it possible to prevent deformation of the lower thrust plate 452 which would be caused by, for example, press fitting. The adhesive agent 78 is applied on the lower surface of the sleeve body 451 or the upper surface of the lower thrust plate 452. Then, the lower thrust plate 452 is attached to the sleeve body 451. The adhesive agent 78 is arranged in at least a portion of the inner surface of each of the adhesive agent grooves 642 of the lower thrust plate 452. By providing the adhesive agent grooves 642, it is possible to easily expand the circumferentially-applied adhesive agent 78 in the radial direction. As a result, it becomes possible to secure the required bonding strength. Preferably, the adhesive agent 78 is, for example, a thermosetting adhesive agent whose viscosity is decreased prior to occurrence of hardening caused by heating.

In general, the adhesive agent 78 is slightly extruded from the radial outer end portions of the adhesive agent grooves 642. The height variation portion 641 of the lower thrust plate 452 preferably includes a height variation surface 640 inclined radially inward and upward. The adhesive agent 78 extruded radially outward from the adhesive agent grooves 642 is held between the height variation surface 640 and the lower annular surface 461 of the sleeve body 451.

The adhesive agent 78 extruded radially inward from the adhesive agent grooves 642 is preferably provided between the outer circumferential surface 458 of the lower protrusion portion 456 and the inner circumferential surface 644 of the lower thrust plate 452. In the following description, the gap defined between the outer circumferential surface 458 of the lower protrusion portion 456 and the inner circumferential surface 644 of the lower thrust plate 452 will be referred to as "vertical adhesive agent gap 781". The lower portion of the outer circumferential surface 458 is preferably a slant surface inclined radially inward and downward. Thus, the adhesive agent 78 is held stably. More specifically, the lower portion of the vertical adhesive agent gap 781 preferably includes an adhesive agent holding gap 782 whose radial width is gradually increased downward.

The inner circumferential surface 644 of the lower thrust plate 452 may be inclined radially outward and downward. In other words, in the adhesive agent holding gap 782, the outer circumferential surface 458 of the lower protrusion portion 456 is inclined radially inward and downward and the inner circumferential surface 644 of the lower thrust plate 452 is parallel or substantially parallel to the center axis J1 or inclined radially outward and downward. In the adhesive agent holding gap 782, the angle between the outer circumferential surface 458 of the lower protrusion portion 456 and the center axis J1 is larger than the angle between the inner circumferential surface 644 of the lower thrust plate 452 and the center axis J1. This makes it possible to easily secure the size of the lower thrust dynamic-pressure bearing portion 52a while providing the adhesive agent holding gap 782.

Figure 12:
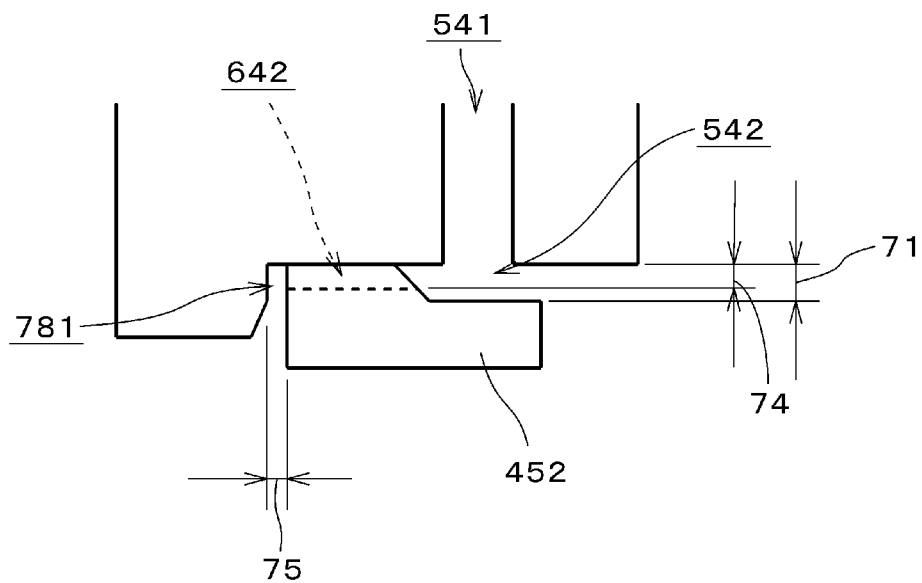
FIG. 12 is a schematic diagram showing a lower thrust plate according to a preferred embodiment of the present invention and its vicinity.

As shown in FIG. 12, the axial depth 74 of the adhesive agent grooves 642 is preferably smaller than the axial width 71 of the lower horizontal communication path 542. The minimum radial width 75 of the vertical adhesive agent gap 781 is also preferably smaller than the axial width 71. Thus, the adhesive agent 78 extruding into the lower horizontal communication path 542 is pushed toward the adhesive agent grooves 642 and the vertical adhesive agent gap 781 by a capillary phenomenon such that the adhesive agent 78 is preferably prevented from clogging the vertical communication path 541. It should be noted that only a single adhesive agent groove 642 may be provided if so desired.

Figure 13:
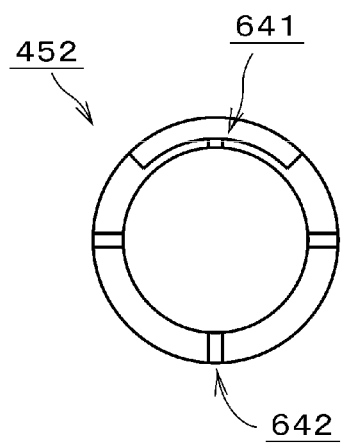
FIG. 13 is a plan view of another example of the lower thrust plate according to a preferred embodiment of the present invention.

FIG. 13 is a plan view showing another example of the lower thrust plate 452 in accordance with a preferred embodiment of the present invention. In the lower thrust plate 452 shown in FIG. 13, the height variation portion 641 is provided in only a portion of the lower thrust plate 452 along the circumferential direction. In other words, only a portion of the outer edge portion of the lower thrust plate 452 along the circumferential direction is depressed downward. Other configurations of the lower thrust plate 452 shown in FIG. 13 remain the same as those of the lower thrust plate 452 shown in FIG. 8. When assembling the bearing mechanism 4, the lower thrust plate 452 is preferably attached to the lower portion of the sleeve body 451 in such a fashion that the radial outer region of the height variation portion 641 overlaps with the lower opening portion 544 of the vertical communication path 541.

Figure 14:
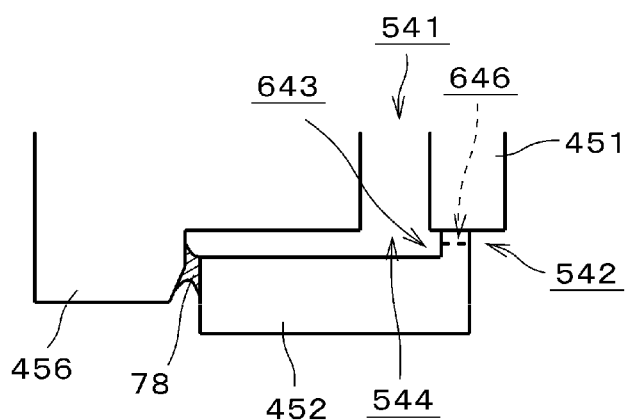
FIG. 14 is a sectional view of a further example of the lower thrust plate according to a preferred embodiment of the present invention.

FIG. 14 is a sectional view showing a further example of the lower thrust plate 452 in accordance with a preferred embodiment of the present invention. The upper surface of the lower thrust plate 452 shown in FIG. 14 preferably includes a height variation portion 643. The radial inner region of the height variation portion 643 is positioned axially below the radial outer region thereof. At least a portion of the radial inner region of the height variation portion 643 axially overlaps with the lower opening portion 544 of the vertical communication path 541. The upper surface of the lower thrust plate 452 preferably includes a groove 646 extending from the height variation portion 643 to the outer circumferential surface of the lower thrust plate 452. As the lower thrust plate 452 is attached to the sleeve body 451, a lower horizontal communication path 542 is preferably defined by the lower surface of the sleeve body 451 and the groove 646. The gap between the outer circumferential surface of the lower protrusion portion 456 of the sleeve body 451 and the inner circumferential surface of the lower thrust plate 452 is preferably sealed by the adhesive agent 78. With this structure, it is possible to easily provide the lower horizontal communication path 542.

A depression portion positioned axially below the remaining portion on the upper surface of the lower thrust plate 452 may be provided in many different shapes and arrangements as long as the depression portion overlaps with the lower opening of the vertical communication path 541. For example, a depression portion may be provided at the radial center of the lower thrust plate 452. A lower horizontal communication path 542 can be provided in the sleeve portion 45 by providing a recess portion, such as, for example, a groove or the like, which extends from the depression portion to the outer circumferential surface of the lower thrust plate 452.

Figure 15:
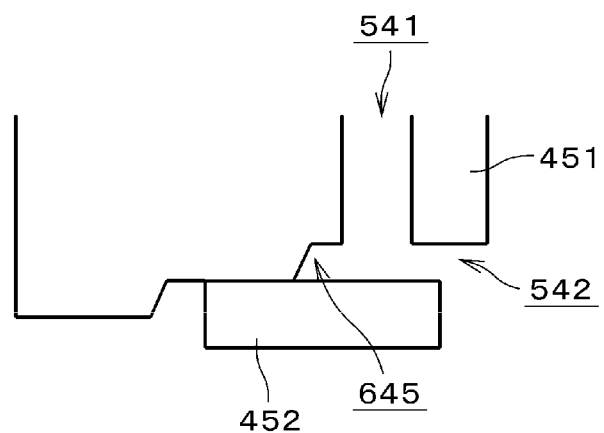
FIG. 15 is a view showing a still further example of the lower thrust plate and the sleeve body according to a preferred embodiment of the present invention.

FIG. 15 is a view showing a still further example of the lower thrust plate 452 and the sleeve body 451. In the example shown in FIG. 15, the lower surface of the sleeve body 451 preferably includes a height variation portion 645. The radial outer region of the height variation portion 645 is preferably positioned axially above the radial inner area thereof. The height variation portion 645 may be provided only in the vicinity of the lower opening of the vertical communication path 541 or may be provided in the entire periphery of the lower surface of the sleeve body 451. The upper surface of the lower thrust plate 452 is planar. A radially-extending adhesive agent groove may be provided on the upper surface of the lower thrust plate 452. As the lower thrust plate 452 is attached to the lower portion of the sleeve body 451, a radially-extending lower horizontal communication path 542 is defined between the radial outer region of the height variation portion 645 and the upper surface of the lower thrust plate 452. With the structure shown in FIG. 15, it is possible to easily provide the lower horizontal communication path 542. It is also possible to simplify the shape of the lower thrust plate 452.

Figure 16:
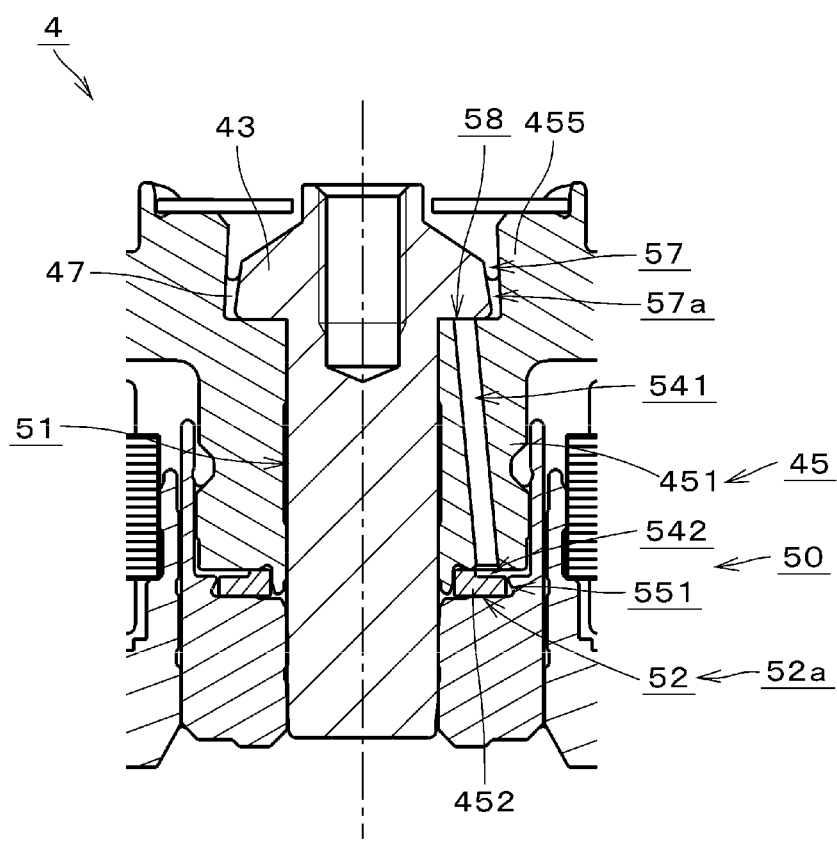
FIG. 16 is a sectional view of another example of the bearing mechanism according to a preferred embodiment of the present invention.

FIG. 16 is a view showing another example of the bearing mechanism 4 of a preferred embodiment of the present invention. The bearing mechanism 4 shown in FIG. 16 is not provided with an upper thrust dynamic-pressure bearing portion. Other configurations of the bearing mechanism 4 shown in FIG. 16 remain the same as those of the bearing mechanism 4 shown in FIG. 3. The same configurations as those shown in FIG. 3 will be designated by like reference symbols.

In the bearing mechanism 4 shown in FIG. 16, the vertical communication path 541 is preferably inclined radially inward and upward. The upper surface of the sleeve body 451 is opposed to the lower surface of the upper opposing portion 43. In the following description, the gap defined between the upper surface of the sleeve body 451 and the lower surface of the upper opposing portion 43 will be referred to as "upper thrust gap 58". In other words, the lower surface of the upper opposing portion 43 is axially opposed to the upper end surface of the sleeve portion 45 through the upper thrust gap 58. However, the upper thrust gap 58 preferably only serves as a gap and does not define up an upper thrust dynamic-pressure bearing portion.

The upper opening of the vertical communication path 541 axially overlaps with the lower surface of the upper opposing portion 43. An upper seal gap 57 is defined between the outer circumferential surface of the upper opposing portion 43 and the inner circumferential surface of the upper outer ring-shaped portion 455. A lubricant 47 is held within the upper seal gap 57 so as to define an upper seal portion 57a. The upper seal portion 57a is inclined radially inward and upward. Thus, air bubbles existing within the lubricant 47 are efficiently discharged from the upper seal portion 57a. The vertical communication path 541 is substantially joined to the upper seal gap 57.

A magnetically-generated downward force acts on the sleeve portion 45. The sleeve portion 45 is preferably axially supported by only the lower thrust dynamic-pressure bearing portion 52a. As is the case in FIG. 3, there is provided a circulation path 50 mainly defined by the lower thrust gap 52, the radial gap 51, the upper thrust gap 58, the vertical communication path 541, the lower horizontal communication path 542, and the vertical gap 551. The circulation path 50 is filled with the lubricant 47. The circulation path 50 and the upper seal gap 57 communicate with each other. The circulation path 50 and the upper seal gap 57 are filled with the lubricant 47. The outer peripheral portion of the upper thrust gap 58 communicates with the upper seal gap 57. In the circulation path 50, the lubricant 47 flows downward along the radial gap 51 during the rotation of the sleeve portion 45.

The structure near the lower thrust plate 452 and the filling method of the lubricant 47 preferably remain the same as those shown in FIG. 3 or described in other examples. Accordingly, it is possible to fill the lubricant 47 with ease.

Figure 17:
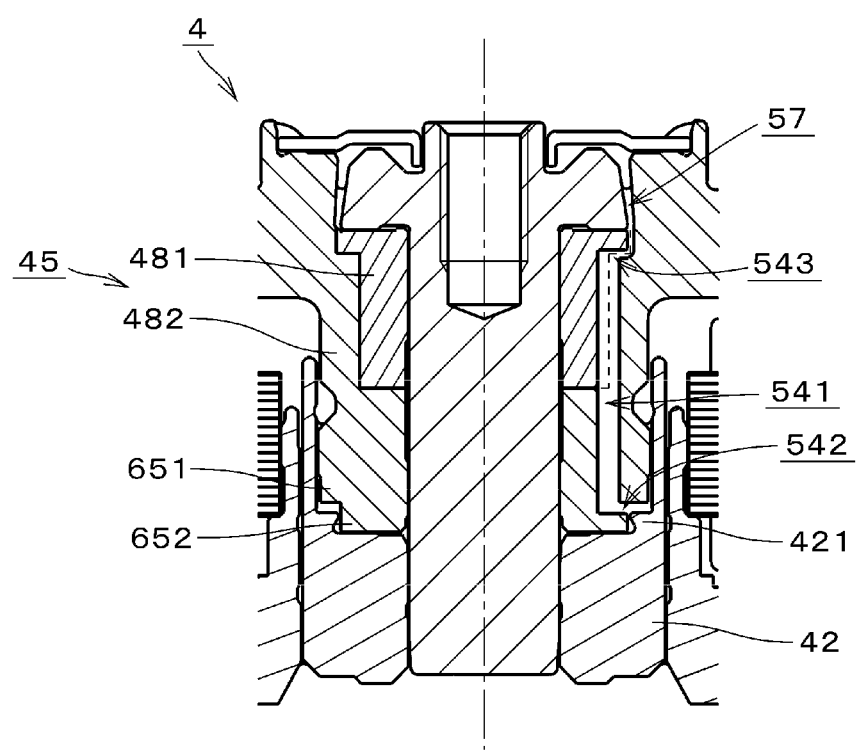
FIG. 17 is a sectional view of a further example of the bearing mechanism according to a preferred embodiment of the present invention.

FIG. 17 is a view showing a further example of the bearing mechanism 4 according to a preferred embodiment of the present invention. The bearing mechanism 4 shown in FIG. 17 is preferably not provided with the lower thrust plate 452 and the upper thrust plate 453 shown in FIG. 3. In the example shown in FIG. 17, the portions corresponding to the lower portion of the sleeve body 451 and the lower thrust plate 452 shown in FIG. 3 are preferably continuously integrated with each other as a single monolithic member. Additionally, the portions corresponding to the upper portion of the sleeve body 451 and the upper thrust plate 453 shown in FIG. 3 are also continuously integrated with each other as a single monolithic member. The sleeve portion 45 including the portions corresponding to the sleeve body 451, the lower thrust plate 452, the upper thrust plate 453, and the flange portion 454 is preferably defined by an upper bearing member 481 including an upper radial dynamic-pressure groove array 611 and a lower bearing member 482 including a lower radial dynamic-pressure groove array 612.

The upper bearing member 481 is a member arranged near the upper radial dynamic-pressure groove array 611. The lower bearing member 482 is a member corresponding to the lower portion of the sleeve body 451, the outer peripheral portion of the upper portion of the sleeve body 451 and the flange portion 454 shown in FIG. 3. Other configurations of the bearing mechanism 4 shown in FIG. 17 remain the same as those of the bearing mechanism 4 shown in FIG. 3. The same configurations as those shown in FIG. 3 will be designated by like reference symbols.

As is the case in FIG. 3, the sleeve portion 45 preferably includes a vertical communication path 541 as a first communication path, a lower horizontal communication path 542 as a second communication path, and an upper horizontal communication path 543 as a third communication path. Preferably, the outer circumferential surface of the upper bearing member 481 axially overlaps with the vertical communication path 541. This makes it possible to provide the vertical communication path 541 with ease. The lower horizontal communication path 542 and the upper horizontal communication path 543 may be provided only near the end portion of the vertical communication path 541 or may be provided in an annular shape over the entire periphery.

In the bearing mechanism 4 shown in FIG. 17, the lower portion of the sleeve portion 45 preferably includes a large-diameter portion 651 and a small-diameter portion 652. The small-diameter portion 652 is smaller in diameter than the large-diameter portion 651. The small-diameter portion 652 is the lowermost portion of the sleeve portion 45 and is positioned below the large-diameter portion 651. The lower opposing portion 42 preferably includes an outer periphery protrusion portion 421. Accordingly, it is preferably possible to easily fill the lubricant 47 from the upper seal gap 57.

Figure 18:
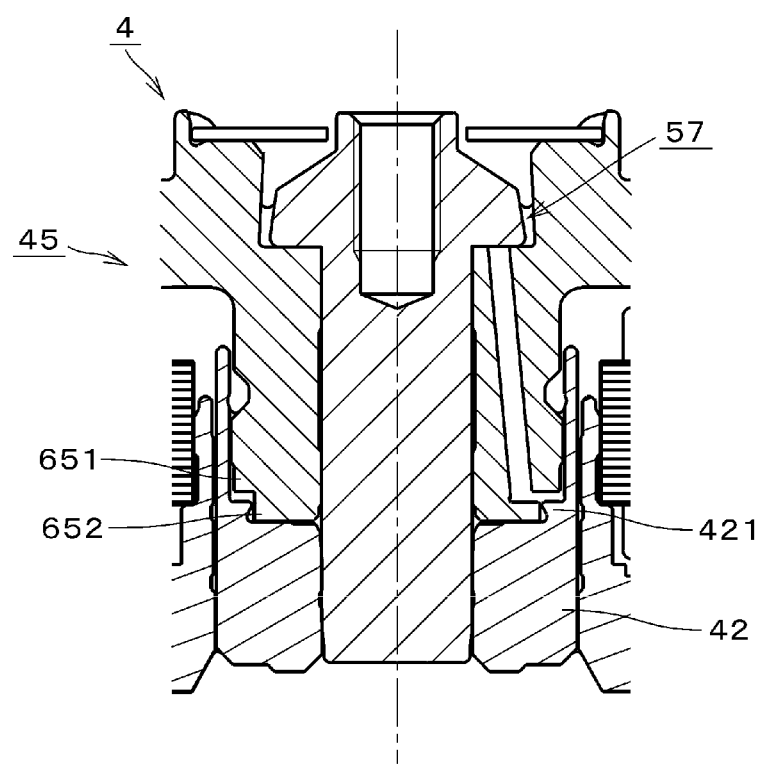
FIG. 18 is a sectional view of a still further example of the bearing mechanism according to a preferred embodiment of the present invention.

As shown in FIG. 18, if so desired, a structure not provided with any thrust plate may be applied to the bearing mechanism 4 shown in FIG. 16. In the bearing mechanism 4 shown in FIG. 18, the sleeve body 451 and the lower thrust plate 452 shown in FIG. 16 are continuously defined with each other as a single monolithic member. Other configurations of the bearing mechanism 4 shown in FIG. 18 remain the same as those of the bearing mechanism 4 shown in FIG. 16. The same configurations as those shown in FIG. 16 will be designated by like reference symbols.

In the bearing mechanism 4 shown in FIG. 18, the sleeve portion 45 preferably includes a large-diameter portion 651 and a small-diameter portion 652 as in the bearing mechanism 4 shown in FIG. 17. The lower opposing portion 42 preferably includes an outer periphery protrusion portion 421. Accordingly, it is preferably possible to easily fill the lubricant 47 from the upper seal gap 57.

While certain preferred embodiments of the present invention have been described above, the present invention is not limited thereto and may be modified in many different forms.

For example, the radial dynamic-pressure groove array may be arranged on the outer circumferential surface of the shaft portion 41. Similarly, the lower thrust dynamic-pressure groove array 621 may be provided on the lower surface of the lower thrust plate 452 and the upper thrust dynamic-pressure groove array 622 may be provided on the lower surface of the upper opposing portion 43.

The lower thrust plate 452 and the upper thrust plate 453 may be attached to the sleeve body 451 preferably by, for example, press-fitting, press-fitting and bonding, welding, caulking, etc.

In the bearing mechanisms 4 shown in FIGS. 17 and 18, the lower opening portion 544 need not be necessarily positioned in the border between the large-diameter portion 651 and the small-diameter portion 652 but may instead be positioned near the border.

The motor 12 may be an inner rotor type motor. The motor 12 can be used in a disk drive apparatus other than the hard disk drive apparatus, e.g., an optical disk drive apparatus. Moreover, the motor 12 can be used in other applications than the disk drive apparatus. For example, the motor 12 can be used as a polygon scanner motor in a laser beam printer, a color wheel driving motor in a projector, etc.

The preferred embodiments of the present invention are applicable to a bearing mechanism for motors having different purposes. In addition, the preferred embodiments of the present invention can be applied to a bearing mechanism for other applications than motors.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing mechanism, comprising:
   a shaft portion arranged about a center axis extending in an up-and-down direction, the shaft portion including a cylindrical outer circumferential surface;
   a sleeve portion arranged to rotate about the center axis, the sleeve portion including a through-hole arranged to accommodate the shaft portion;
   a lower opposing portion extending radially outward from a lower portion of the shaft portion, the lower opposing portion including an upper surface axially opposed to a lower end surface of the sleeve portion through a lower thrust gap;
   a lower outer ring-shaped portion whose relative position is fixed with respect to the lower opposing portion, the lower outer ring-shaped portion including a cylindrical or substantially cylindrical inner circumferential surface arranged to surround at least a portion of an outer circumferential surface of the sleeve portion; and
   an upper opposing portion extending radially outward from the shaft portion at an upper side of the sleeve portion, the upper opposing portion including a lower surface axially opposed to an upper end surface of the sleeve portion through an upper thrust gap; wherein
   a radial dynamic-pressure bearing portion is defined in a radial gap between the outer circumferential surface of the shaft portion and an inner circumferential surface of the sleeve portion;
   a lower thrust dynamic-pressure bearing portion is defined in the lower thrust gap;
   a lower seal portion is defined in a lower seal gap between the outer circumferential surface of the sleeve portion and the inner circumferential surface of the lower outer ring-shaped portion;
   an upper seal portion is defined in an upper seal gap joined to the upper thrust gap;
   the sleeve portion includes a lower portion including a large-diameter portion and a small-diameter portion positioned below the large-diameter portion, the small-diameter portion being smaller in diameter than the large-diameter portion;
   the sleeve portion further includes a communication path joined to the upper seal gap, the communication path including an opening portion opened in or near a border between the large-diameter portion and the small-diameter portion;
   the lower opposing portion includes an outer peripheral portion including an outer periphery protrusion portion radially opposed to an outer circumferential surface of the small-diameter portion and axially opposed to a lower surface of the large-diameter portion;
   a straight line interconnecting an outer edge of a lower surface of the small-diameter portion and an outer edge of the lower surface of the large-diameter portion on a cross section including the center axis extends across the outer periphery protrusion portion;

a circulation path including the lower thrust gap, the radial gap, the upper thrust gap, and the communication pass communicates with the lower seal gap and the upper seal gap; and a lubricant is filled in the circulation path, the lower seal gap, and the upper seal gap.

2. The bearing mechanism of claim 1, wherein the sleeve portion includes a sleeve body provided with the large-diameter portion in a lower portion thereof and a lower thrust plate serving as the small-diameter portion, the lower thrust plate fixed to the lower portion of the sleeve body;

the sleeve body includes a lower annular surface radially extending about the center axis and opposed to an upper surface of the lower thrust plate;

the communication path includes a first communication path joined to the upper seal gap and provided with a lower opening portion opened on the lower annular surface and a second communication path defined between the sleeve body and the lower thrust plate to interconnect the lower opening portion and the lower seal gap; and the lower opening portion axially overlaps with the lower thrust dynamic-pressure bearing portion.

3. The bearing mechanism of claim 2, wherein the second communication path includes a radial outer opening positioned on an outer circumferential surface of the lower thrust plate; and a radial width between the outer circumferential surface of the lower thrust plate and an inner circumferential surface of the outer periphery protrusion portion and an axial width between the lower surface of the large-diameter portion and an upper surface of the outer periphery protrusion portion when a lower surface of the lower thrust plate is brought into contact with an upper surface of the lower opposing portion are equal to or smaller than an axial width of a radial outer opening of the second communication path.

4. The bearing mechanism of claim 1, wherein an upper portion of an outer peripheral portion of the sleeve portion extends more radially outward than the lower seal portion.

5. The bearing mechanism of claim 1, wherein the upper seal portion is inclined radially inward and upward.

6. The bearing mechanism of claim 2, wherein the lower thrust plate includes a height variation portion.

7. The bearing mechanism of claim 6, wherein an upper surface of a region of the lower thrust plate located radially outward of the height variation portion is positioned below an upper surface of the outer periphery protrusion portion.

8. The bearing mechanism of claim 6, wherein an upper surface of the lower thrust plate includes a radially-extending adhesive agent groove located radially inward of the height variation portion.

9. The bearing mechanism of claim 8, wherein an axial depth of the adhesive agent groove is smaller than an axial width of a radial outer opening of the second communication path.

10. The bearing mechanism of claim 2, wherein an inner peripheral portion of a lower portion of the sleeve body includes a lower protrusion portion protruding downward.

11. The bearing mechanism of claim 10, wherein an adhesive agent gap is defined between an outer circumferential surface of the lower protrusion portion and an inner circumferential surface of the lower thrust plate.

12. The bearing mechanism of claim 11, wherein a radial width of the adhesive agent gap is smaller than an axial width of a radial outer opening of the second communication path.

13. The bearing mechanism of claim 1, wherein the lower seal portion is a pumping seal portion.

14. The bearing mechanism of claim 1, wherein the radial dynamic-pressure bearing portion includes an upper radial dynamic-pressure bearing portion and a lower radial dynamic-pressure bearing portion;

each of the upper radial dynamic-pressure bearing portion and the lower radial dynamic-pressure bearing portion includes a herringbone-shaped dynamic-pressure generating groove array, the dynamic-pressure generating groove array of the upper radial dynamic-pressure bearing portion includes an upper herringbone region and a lower herringbone region, an axial length of the upper herringbone region being larger than an axial length of the lower herringbone region; and the lubricant is arranged to flow downward along the radial gap during rotation of the sleeve portion.

15. A motor, comprising:

the bearing mechanism of claim 1;

a stationary unit provided with a stator; and a rotary unit including a rotor magnet, the rotary unit rotatably supported by the bearing mechanism with respect to the stationary unit.

16. A disk drive apparatus, comprising:

the motor of claim 15 arranged to rotate a disk;

an access unit arranged to perform at least one of information reading and writing with respect to the disk; and a housing arranged to accommodate the disk, the motor and the access unit.

* * * * *